Aug. 12, 1969 J. E. RANDOLPH ET AL 3,461,413

SHIELDED ELECTRICAL INDUCTOR COMPONENT

Filed Nov. 10, 1966

INVENTORS
JOHN E. RANDOLPH
ADRIAN D. WOOD

BY R.C. Terry

ATTORNEY

United States Patent Office 3,461,413

Patented Aug. 12, 1969

3,461,413

SHIELDED ELECTRICAL INDUCTOR COMPONENT

John E. Randolph, Palatine, and Adrian D. Wood, Elk Grove Village, Ill., assignors to Teletype Corporation, Skokie, Ill., a corporation of Delaware Filed Nov. 10, 1966, Ser. No. 593,368
Int. Cl. H01f *15/04*
U.S. Cl. 336—84 5 Claims

ABSTRACT OF THE DISCLOSURE

A shielded electrical component including a bobbin comprised of a winding core and a flange having an L-shaped hole extending through it including a plating receiving leg extending axially into the flange and a terminal receiving leg extending radially through the flange, a layer of conductive plating covering the winding core of the bobbin and extending into the plating receiving leg of the L-shaped hole and a terminal positioned in the terminal receiving leg of the L-shaped hole in engagement with the material of the bobbin and extending into engagement with the plating in the plating receiving leg.

This invention relates to shielded electrical components and to methods of making them and more particularly to a bobbin having a conductive shield over its interior portions and to a method of making such a shield.

The communications industry has recently begun to equip the electrical components of its products with radio frequency interference shielding in order to prevent dissemination of signals representative of the activity of the components. In order that radio frequency interference shielding can be accomplished at a reasonable cost, it is necessary that the shielding of each of the components be carried out in as low cost a manner as possible.

Accordingly, an object of this invention is to provide an inexpensive method of shielding electrical components and of making electrical connections to such shields.

Another object of this invention is to provide a method of shielding bobbins and of making electrical connections with such shields which is comprised of a small number of easily carried out steps.

A further object of this invention is to provide a low cost shielded bobbin.

In the preferred embodiment of the invention these and other objects are achieved in a bobbin having a winding core portion and a flange extending radially from the core by forming a plating receiving hole axially into the flange from a point adjacent the winding portion of the bobbin and forming a terminal receiving hole radially through the flange from the plating receiving hole to a point in the peripheral edge of the flange. The winding core and the surface of the flange adjacent the core are coated with copper so that the copper extends into the plating receiving hole. A terminal is then positioned in the terminal receiving hole in engagement with the copper in the plating receiving hole to provide an electrical connection with the shield.

A further understanding of the invention may be had by referring to the following detailed description when taken in conjunction with the drawings wherein.

Figure 1:
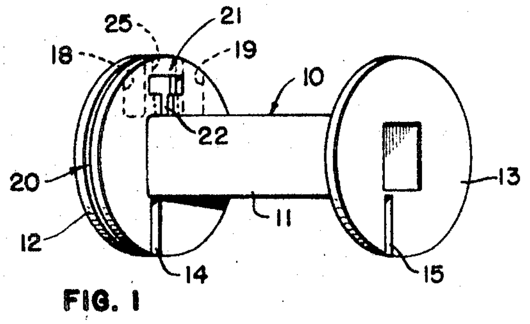
FIG. 1 is a perspective view of a bobbin used in carrying out the present invention.

Referring now to the drawings, wherein like reference numerals designate like parts throughout the several views, with particular reference being had to FIG. 1, there is shown a bobbin 10 comprised of a center winding core portion 11 and a pair of flanges 12 and 13. The winding portion 11 is illustrated as square in shape in accordance with a common practice in the bobbin art but may, however, be of any desired shape to suit any particular circumstance.

The flanges 12 and 13 of the bobbin 10 have molded into them slots 14 and 15, respectively, which extend from the winding portion 11 of the bobbin 10 to the periphery of the flanges and the winding core 11 has a shallow slot 16 molded in it which extends from the slot 14 to the slot 15. Molded into the flange 12 are a pair of terminal receiving holes 18 and 19 and a wire guiding groove 20 which extends entirely around the peripheral edge of the flange 12 and is interrupted only by the slot 14.

Figure 2:
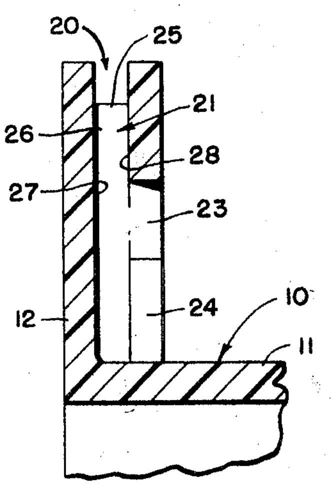
FIG. 2 is an enlarged partial sectional view of the bobbin shown in FIG. 1 showing the details of the holes in one flange of the bobbin.
Figure 3:
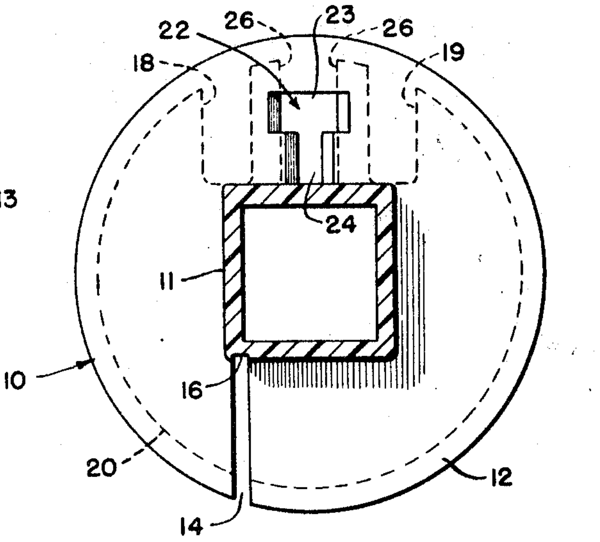
FIG. 3 is an enlarged sectional view of the bobbin shown in FIG. 1 taken through the winding portion of the bobbin and further illustrating the details of the holes in the flange.

As is best shown in FIGS. 2 and 3 the flange 12 also has a generally L-shaped hole or passageway 21 formed in it which extends from a point adjacent the winding portion 11 through the flange to a point in the peripheral edge of the flange between the terminal receiving holes 18 and 19. The hole 21 is comprised of a plating receiving T-shaped hole 22, including an upper wide portion 23 and a lower narrow portion 24, extending from the inner wall of the flange 12 approximately half-way through the flange and a terminal receiving hole 25 defined by side walls 26, outer wall 27 and inner wall 28. The terminal receiving hole 25 extends radially inwardly from the peripheral edge of the flange 12 into communication with the T-shaped hole 22 and is identical to the terminal receiving holes 18 and 19 except where its inner wall 28 is broken by the plating receiving hole 22. The sides of both the upper wide portion 23 and the narrow portion 24 of the T-shaped hole 22 slant continuously inwardly from the inner surface of the flange 12 to the inner wall 28 of the terminal receiving hole 25.

Figure 4:
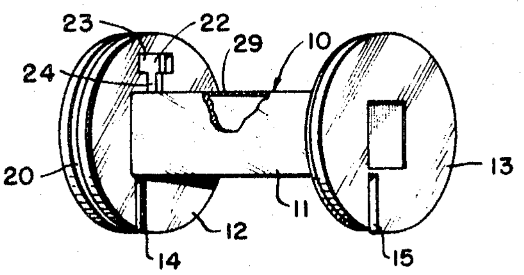
FIG. 4 is a view similar to FIG. 1 showing the bobbin of FIG. 1 in its plated and insulated state.
Figure 5:
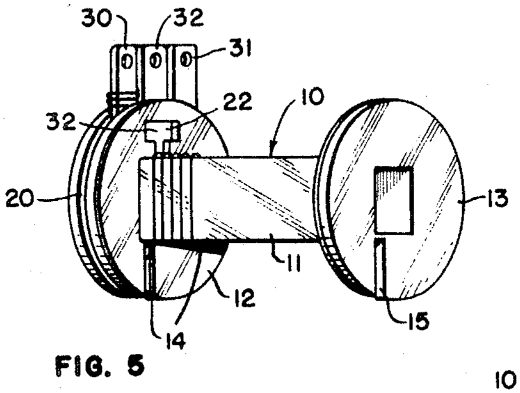
FIG. 5 is a view similar to FIGS. 1 and 4 showing the bobbin with its terminals inserted and with a coil of conductive wire partially wound onto the bobbin.
Figure 6:
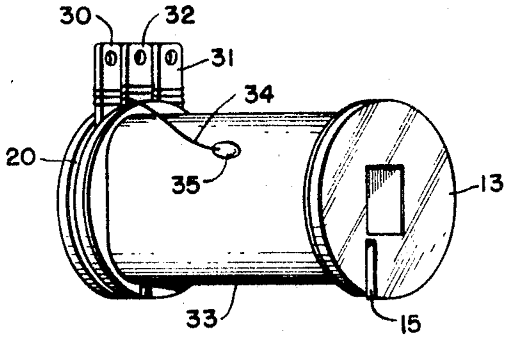
FIG. 6 is a view of a completed coil assembly made in accordance with the present invention.

Referring now to FIGS. 4, 5 and 6, the steps which take the bobbin 10 from the raw state shown in FIGS. 1, 2 and 3 to a completed state are shown. First, a rectangular masking bar is placed in the slots 14 and 15 and in the groove 16 to form a mask. Then, the interior portions of the bobbin 10, including the interior of the T-shaped hole 22, are coated with silver paint or a similar material. The silver paint is kept off of the outer surfaces of the flanges 12 and 13 and the peripheral surfaces thereof and is also kept out of the slots 14 and 15.

The slanted sides of the upper wide portion 23 and the lower narrow portion 24 of the T-shaped hole 22 aid in coating the interior of the T-shaped hole 22 with the silver paint. After the silver paint has dried the masking bar is removed from the groove 16 and the slots 14 and 15.

After the painting operation has been completed the bobbin 10 is plated with a layer of copper 29 or other material suitable for radio frequency interference shielding. Only those portions of the bobbin which were covered with silver paint accept the plating and accordingly, the copper covers only the interior walls of the flanges 12 and 13 and the winding portion 11. The slanting walls of the plating receiving hole 22 facilitate the entry of copper into the hole. The interior of the groove 16 extending along the winding core 11 between the slots 14 and 15 which was masked prior to painting is not covered with copper. After the plating step the entire bobbin 10 is dipped in an insulating material.

As is shown in FIG. 5 the next step in the construction of the shielded bobbin is the insertion of terminals 30, 31 and 32 into the holes 18, 19 and 25, respectively, in the flange 12. The terminals 30 and 31 are similar to the terminals commonly used in connection with bobbins. The terminal 32, however, is inserted in the terminal receiving hole 25 so that it passes into the T-shaped hole 22. Since the interior of the T-shaped hole is copper plated this causes the terminal 32 to come into electrical contact with the copper plating and to form an electrical connection with the entire shielding layer on the interior surfaces of the bobbin 10. The sloping sides of the T-shaped hole 22 assure a good electrical connection between the plating layer 29 and the terminal 32. The fact that the side walls 26, the outer wall 27 and portions of the inner wall 28 extend past the upper wide portion 23 assure that the terminal 32 will be firmly supported without placing strain on the layer of copper 29. The step of dipping the bobbin in an insulating material may be performed after the terminals 30, 31 and 32 are inserted if desired.

After the insertion of the terminals 30, 31 and 32 a coil of conductive wire is wound onto the winding portion 11. This operation starts with the attachment of a wire to the terminal 30. The wire is then guided in the wire guiding groove 20 in the peripheral edge of the flange 12 until the slot 14 is reached whereupon the wire is directed through the slot 14 into engagement with the winding core 11. After engagement of the wire with the winding core portion 11 an ordinary coil winding operation takes place and the interior portion of the bobbin 10 is substantially filled with a coil of conductive wire. The insulating covering which was coated onto the bobbin 10 after the plating operation prevents the wire in the coil from coming into electrical contact with the copper plating.

After the desired number of turns of wire are wound onto the winding portion 11 the trailing end of the coil is directed out through the slot 14 into the wire guiding groove 20 in the peripheral edge of the flange 12 and through the groove 20 and is attached to the terminal 31, at which time the coil is completed. The slots 14 and 15 and the groove 16 which are not copper plated due to the masking of the silver paint prevent a shading coil from being formed by the copper plating which would hinder the operation of the coil.

After the end of the coil is connected to the terminal 31 a layer of insulating tape is wound around the coil and then a layer of shielding material 33 such as copper covered tape, is wrapped around the outside of the coil. A gap extending from the slot 14 to the slot 15 is left in the tape so that the tape does not form a shading coil around the winding on the bobbin. This causes a layer of electrically conductive material to surround the coil about substantially its entire periphery. The copper covered tape 33 is connected to the terminal 32 by means of a wire 34 and a drop of solder 35 or by other suitable means so that the entire shield of the bobbin 10 is electrically connected together. After the winding of the copper tape 33 and the connecting of the tape to the terminal 32, the bobbin 10 may be covered with an insulating material, such as plastic tape, if desired.

Although only one embodiment of the device is shown and described herein and although only one method of manufacturing the device is described it should be understood that the invention is not limited to the structure and method described, but is capable of modification and rearrangement without departing from the spirit of the invention.

What is claimed is:

1. A shielded electrical structure comprising:
a bobbin comprised of a winding core and a flange extending radially therefrom and having formed in it a plating receiving hole that is completely surrounded by the material of the bobbin along at least part of its length and that extends axially into the flange from a point adjacent the winding core and a terminal receiving hole that extends radially inwardly from the periphery of the flange into communication with the plating receiving hole;
a layer of shielding covering the winding core and the surface of the flange adjacent the core and extending into the plating receiving hole, and
a terminal positioned in the terminal receiving hole in engagement with the material of the bobbin and extending into engagement with the layer of shielding in the plating receiving hole.

2. The structure according to claim 1 wherein the shielding receiving hole has sides which taper inwardly from the point adjacent the winding core and wherein the layer of shielding extends continuously from the surface of the flange adjacent the winding core along the tapered sides of the plating receiving hole to the interior of the hole.

3. A shielded inductive structure including:
a bobbin comprised of a winding core and a flange having an L-shaped hole formed through it that includes a plating receiving leg which extends axially through the flange from a point on the flange adjacent the winding core and which is completely surrounded by the material of the flange along at least a portion of its length and a terminal receiving leg which extends radially through the flange from a point on the peripheral edge of the flange into communication with the plating receiving hole and which is completely surrounded by the material of the flange along at least a portion of its length;
a coating of conductive material substantially covering the winding core of the bobbin and extending into the plating receiving leg of the L-shaped hole in the flange, and
a terminal positioned in the terminal receiving leg of the L-shaped hole in the flange in engagement with the material of the flange and extending into engagement with the conductive material in the plating receiving leg of the L-shaped hole.

4. The shielded structure according to claim 3 wherein the plating receiving leg of the L-shaped hole is T-shaped in cross section and wherein the sides of the plating receiving hole slope toward the center of the plating receiving hole from the surface of the flange adjacent the winding core to facilitate the entry of the coating of conductive material into the plating receiving leg.

5. As an article of manufacture, a subassembly comprising a bobbin including a winding core and a flange extending radially therefrom and having formed in it a plating receiving hole which extends axially into the flange from a point adjacent the winding core and which is comprised of a first portion having sides which taper inwardly from the surface of the flange adjacent the winding core to a first point and a second portion having sides which taper inwardly from the surface of the flange adjacent to the winding core to a second point and a terminal receiving hole which extends radially through the flange from the plating receiving hole to the peripheral edge of the flange and which is defined by an outer wall extending radially inwardly from the peripheral edge of the flange to the first point, an inner wall which extends radially inwardly from the peripheral edge of the flange to the second point and side walls which extend radially inwardly from the peripheral edge of the flange past the first portion of the plate receiving hole to provide terminal supporting surfaces on both sides thereof.

References Cited

UNITED STATES PATENTS

| | | | |
|---|---|---|---|
| 2,922,932 | 1/1960 | Glowacki et al. | 336—192 XR |
| 3,117,294 | 1/1964 | Muszynski et al. | 336—192 |
| 3,200,298 | 8/1965 | Garibotti | 174—68.5 XR |
| 3,312,919 | 4/1967 | Ross | 336—84 |
| 3,332,049 | 7/1967 | Hisano | 336—84 XR |

DARRELL L. CLAY, Primary Examiner

U.S. Cl. X.R.

174—35; 242—118; 336—192, 198